US011742528B1

(12) United States Patent
Sahu

(10) Patent No.: US 11,742,528 B1
(45) Date of Patent: *Aug. 29, 2023

(54) ROLLABLE, FOLDABLE, AND STACKABLE ZINC BROMINE ELECTROCHEMICAL CELL

(71) Applicant: Science Cadets, Inc., San Jose, CA (US)

(72) Inventor: Saroj Kumar Sahu, San Jose, CA (US)

(73) Assignee: Science Cadets, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/093,130

(22) Filed: Jan. 4, 2023

(51) Int. Cl.
| *H01M 10/36* | (2010.01) |
| *H01M 10/04* | (2006.01) |
| *H01M 50/466* | (2021.01) |
| *H01M 50/609* | (2021.01) |

(52) U.S. Cl.
CPC ..... *H01M 10/365* (2013.01); *H01M 10/0459* (2013.01); *H01M 50/466* (2021.01); *H01M 50/609* (2021.01); *H01M 2300/0002* (2013.01)

(58) Field of Classification Search
CPC ............. H01M 10/365; H01M 50/609; H01M 50/466; H01M 10/0459; H01M 2300/0002
See application file for complete search history.

(56) References Cited

U.S. PATENT DOCUMENTS

2013/0323584 A1* 12/2013 Schaefer ............. H01M 50/609
429/246

FOREIGN PATENT DOCUMENTS

JP        2004095382 A   *  3/2004

OTHER PUBLICATIONS

Google English Machine Translation of JP 2004095382, originally published to Monma Jun on Mar. 25, 2004 (Year: 2004).*

* cited by examiner

*Primary Examiner* — Cynthia H Kelly
*Assistant Examiner* — Niara Trant
(74) *Attorney, Agent, or Firm* — Chen-Chi Lin

(57) ABSTRACT

A zinc bromine electrochemical cell comprises an anode-side subassembly, an insulating porous separator, and a cathode-side subassembly. The anode-side subassembly comprises an anode current collector, an anode sheet, and an anode insulating net. The cathode-side subassembly comprises a cathode insulating mesh, a cathode graphite felt, and a cathode current collector. The zinc bromine electrochemical cell is rollable, foldable, or stackable.

18 Claims, 11 Drawing Sheets

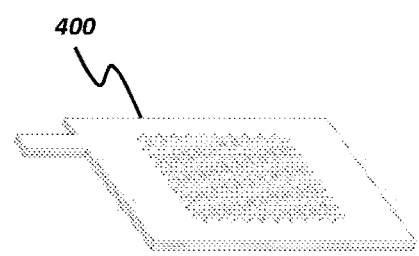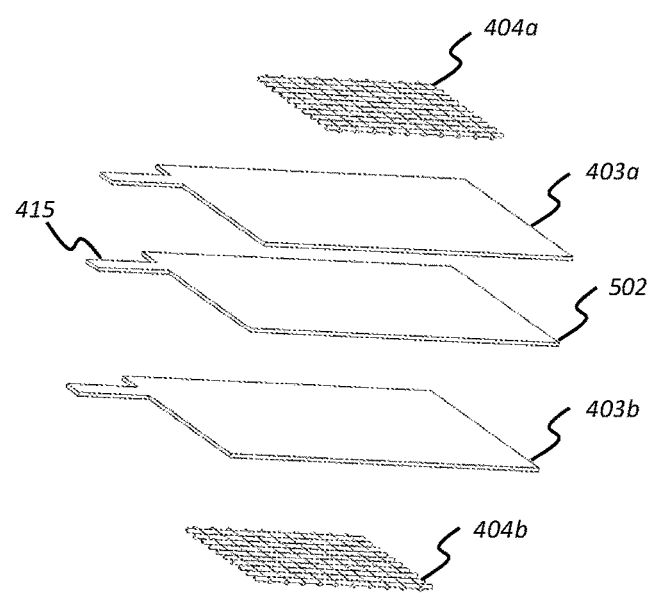
FIG. 4A
FIG. 4B

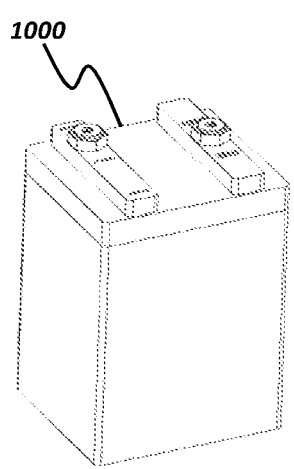
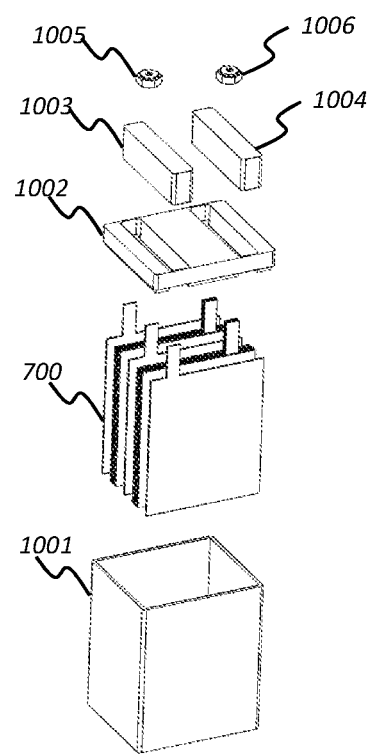
FIG. 10A
FIG. 10B

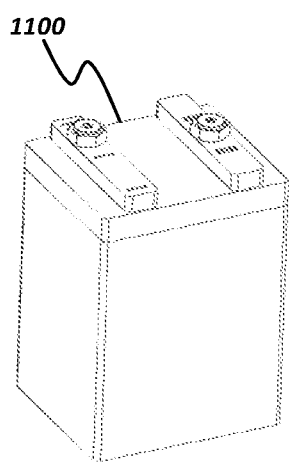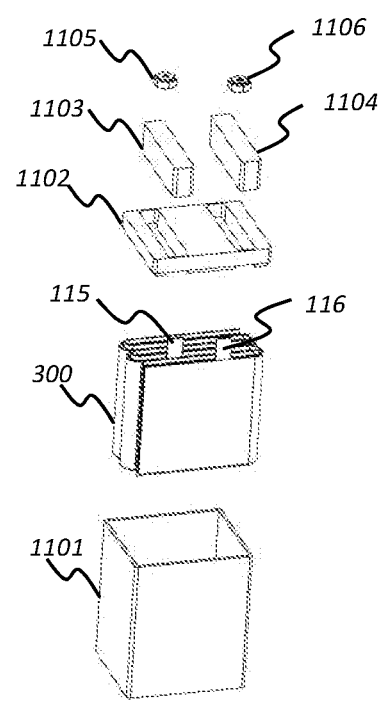
FIG. 11A
FIG. 11B

ROLLABLE, FOLDABLE, AND STACKABLE ZINC BROMINE ELECTROCHEMICAL CELL

FIELD OF THE INVENTION

This invention relates generally to a zinc bromine electrochemical cell. More particularly, the present invention relates to a zinc bromine electrochemical cell that is rollable, foldable, and stackable.

BACKGROUND OF THE INVENTION

High energy density rechargeable batteries that do not use lithium or cobalt are of great interest in the field of electrochemical energy storage. There is a scarcity of both lithium and cobalt. Cobalt is known for being mined under unethical conditions. There are several non-lithium and non-cobalt battery technologies being developed, such as sodium-prussian blue, nickel-hydride, nickel-hydrogen, nickel-cadmium, iron-chromium, all vanadium, all iron, zinc air, and zinc bromine.

Zinc-bromine technology has been explored by many companies over last 40 years as a flow battery. In a flow battery, the electrolytes are stored in tanks and pumped into the battery volume as required during charge and discharge operations. However, the ancillary systems such as the pumps, tanks, plumbing, and valves take up much volume and as a result the net system energy density of the battery becomes much less than what the basic battery can provide. Furthermore, the complexity of resultant flow system makes the product less reliable and prone to many maintenance calls. For example, while lithium batteries at a system level have a net energy density of 130-200 Watt-hour/kilogram, zinc bromine flow batteries, which have one of the best energy densities in the non-lithium battery space, have an energy density of 20-40 Watt-hour/kilogram at the system level.

Inherently, the zinc bromine chemistry can have a theoretical energy density higher than 200 Watt-hour/kilogram. However, practical implementations needed to get to that degree of energy density create other problems, such as: (A) higher concentration of zinc bromide causing battery resistance to go up; (B) high amount of zinc plating resulting in uneven thickness of zinc on the anode and increases dendrite formation, and subsequently puncturing of the separator and shorting the battery. Such problems require solutions that limit the energy density to less than 40 Watt-hour/kilogram.

SUMMARY OF THE INVENTION

In examples of the present disclosure, a zinc bromine battery without any external flow is disclosed. Problems such as high resistance and zinc dendrites are addressed by a unique battery cell design. Cell designs with cylindrical, folded, or stacked mechanical architectures facilitate a large cell format with a large cell surface area, which increases the capacity of the cell. In one example, for the cylindrical structure, in an extended flat condition, the large format refers to a length of the cell that is three or more times larger than a width of the cell. In another example, for the folded structure or the stacked structure, the large cell surface area refers a top surface area of the cell in an extended flat condition that is three or more times larger than a top surface area of the cell in the folded structure or the stacked structure.

A zinc bromine electrochemical cell comprises an anode-side subassembly, an insulating porous separator, and a cathode-side subassembly. The anode-side subassembly comprises an anode current collector, an anode sheet, and an anode insulating net. The cathode-side subassembly comprises a cathode insulating mesh, a cathode graphite felt, and a cathode current collector. The zinc bromine electrochemical cell is rollable, foldable, or stackable.

BRIEF DESCRIPTION OF THE DRAWINGS

FIG. 4A is an isotropic view and FIG. 4B is an exploded plot of a portion of an anode-side subassembly in examples of the present disclosure.

FIG. 10A is an isotropic view and FIG. 10B is an exploded plot of another cell container and another cell in examples of the present disclosure.

FIG. 11A is an isotropic view and FIG. 11B is an exploded plot of still another cell container and still another cell in examples of the present disclosure.

DETAILED DESCRIPTION OF THE INVENTION

The electrolyte comprises an aqueous solution of zinc bromide in the concentration of 0.5 to 12 molar. Aqueous zinc bromide dissociates into ionic species:

$$ZnBr_2 \leftrightarrow Zn^{2+} + 2Br^- \tag{1}$$

When charging the cell, the anodic reaction is:

$$Zn^{2+} + 2e \rightarrow Zn \tag{2}$$

and the cathodic reaction is:

$$2Br^- \rightarrow Br_2 + 2e \tag{3}$$

When discharging the cell, the reactions in the opposite direction take place. Open circuit voltage (OCV) for this pair of reactions is 1.85V.

Figure 1:
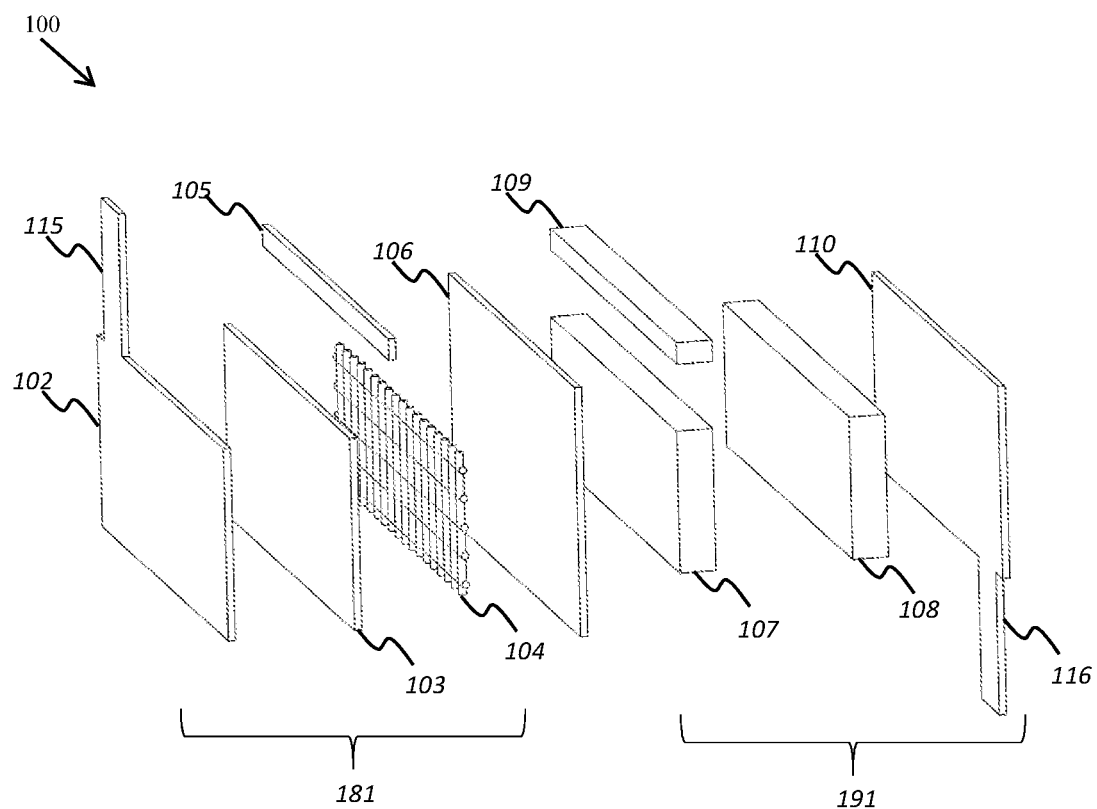
FIG. 1 is an exploded plot of a zinc bromine electrochemical cell in examples of the present disclosure.

FIG. 1 is an exploded plot of a zinc bromine electrochemical cell 100 in examples of the present disclosure. The zinc bromine electrochemical cell 100 comprises an anode-side subassembly 181, an insulating porous separator 106, and a cathode-side subassembly 191. The anode-side subassembly 181 comprises an anode current collector 102 having a connection tab 115, an anode sheet 103, and an anode insulating net 104 comprising a plurality of openings. The cathode-side subassembly 191 comprises a cathode insulating mesh 107, a cathode graphite felt 108, and a cathode current collector 110 having a cathode connection tab 116. The anode-side subassembly 181 and the cathode-side subassembly 191 are separated by the insulating porous separator 106. In one example, each element of the zinc bromine electrochemical cell 100 is disposed by the order shown in FIG. 1.

In examples of the present disclosure, the anode current collector 102 comprises a sheet of copper, copper alloy, aluminum, aluminum alloy, Titanium or Titanium alloy. The anode sheet 103 comprises a zinc sheet. The zinc sheet faces the insulating porous separator 106.

In examples of the present disclosure, the anode sheet 103 comprises a zinc sheet and a carbon or graphite loaded conductive polymer composite sheet. The zinc sheet faces the insulating porous separator 106.

The anode insulating net 104 is between the anode sheet 103 and the insulating porous separator 106. A thickness of the insulating porous separator 106 is in a range from 0.1 mm and 2 mm. The insulating porous separator 106 comprises a polymer having an opening area to surface area ratio greater than 0.4.

In examples of the present disclosure, the cathode current collector 110 comprises a sheet of titanium or titanium alloy.

In examples of the present disclosure, the cathode graphite felt 108 is between the cathode current collector 110 and the cathode insulating mesh 107. The cathode insulating mesh 107 contacts the insulating porous separator 106.

A thickness of the insulating porous separator 106 is in a range from 0.05 mm to 2.0 mm. A porosity of the insulating porous separator 106 is in a range from 20% to 75%. The insulating porous separator comprises a poly-olefin polymer.

An uncompressed porosity of the cathode graphite felt 108 is in a range from 70% to 95%. A compressed porosity of the cathode graphite felt 108 is in a range from 40% to 85%. A compressed thickness of the cathode graphite felt 108 is in a range from 0.5 mm to 10 mm. A graphite fiber diameter of the cathode graphite felt 108 is in a range from 0.0001 mm to 0.1 mm.

A porosity of the cathode insulating mesh 107 is in a range from 50% to 98%. A thickness of the cathode insulating mesh 107 is in a range from 0.05 mm to 1 mm. The cathode insulating mesh comprises fiberglass, polytetrafluoroethylene (PTFE), poly-ethylene or polypropylene.

In examples of the present disclosure, the zinc bromine electrochemical cell 100 further comprises an aqueous electrolyte solution for bromine sequestration and zinc dendrite suppression. The aqueous electrolyte solution comprising zinc bromide and additives.

A plurality of zinc ions are electroplated onto a surface of the anode sheet 103 as zinc metal during a charging process. A portion of the zinc metal is de-plated into another plurality of zinc ions during a discharging process. A plurality of bromine ions are converted to elemental bromine during the charging process. A portion of the elemental bromine is converted to another plurality of bromine ions during the discharging process.

A molarity of the zinc bromide of the aqueous electrolyte solution is in a range from 1.5 to 12.

In examples of the present disclosure, the electrolyte has a few additives for different purposes: (a) additives for reducing zinc dendrite formation and promoting uniform zinc plating; and (b) additives for sequestering free bromine by complexing it.

The additives in the electrolyte for reducing zinc dendrite formation and promoting uniform zinc electroplating during charging include Poly-Ethylene Glycol (PEG) in weight percent between 0.5% and 10% and Polysorbate in weight percent between 0.05% and 5% with respect to water. Both these additives are obtainable from Sigma-Aldrich, Inc.

The additives in the electrolyte for sequestering free bromine include tetra propyl ammonium bromide (TPABr) and methyl ethyl pyrrolidinium bromide (MEPBr). A weight fraction of the TPABr is in a range from 0.01% to 400%. A mixture of the TPABr and the zinc bromide is heterogeneous. A weight fraction of the MEPBr is in a range from 0.01% to 400%. A mixture of MEPBr and the zinc bromide is heterogeneous.

When aqueous bromine is generated at the cathode during charging, a large part of it must be sequestered in a complex. In one example, the large part refers to more than 20%.

For solid-phase sequestration, tetra propyl ammonium bromide (TPABr) is added to the electrolyte in the weight percent of 0% to 400% with respect to water. Since solubility of TPABr is far lower than that of zinc bromide, at high concentrations of zinc bromide, such as above 1 Molar, most of the TPABr crashes out of the solution and being of lower density than the solution, floats to the top of the solution volume, both on anode and cathode sides, as anode sequestration volumes (ASV) 105 and cathode sequestration volumes (CSV) 109, respectively. As elemental bromine is generated on the cathode, part of that is absorbed reversibly by the CSV 109 by virtue of the combination and de-combination reaction:

$$TPABr+Br_2 \leftrightarrow [TPA]^+[Br_3]^- \quad (4)$$

The CSV 109 now comprises part $[TPA]^+[Br_3]^-$ and part TPABr. Sequestering the elemental bromine in this type of complex helps towards the safety of the battery system, as in the case of a damage to the battery and electrolyte leaking out, the toxic and foul-smelling bromine does not get exposed. Besides, the more bromine is sequestered, the less of that is available in the main electrolyte volume, and therefore less diffuses to the anode side of the insulating porous separator 106 to the anode side. That helps in reducing the self-discharge of the cell, thus greatly increasing the coulombic efficiency of the cell architectures built from the cell 100.

The volume of ASV 105 comprises mostly TPABr. Since there is very little bromine on the anode side, almost no TPABr-bromine complexation happens in this volume. Therefore, ASV 105 is an unnecessary but unavoidable in the cell architectures built from the cell 100.

For liquid-phase sequestration, methyl ethyl pyrrolidinium bromide (MEPBr) is added to the electrolyte in the weight percent of 0% to 400% with respect to water. As elemental bromine is generated in the cathode, part of that is absorbed reversibly by MEPBr by virtue of the combination and de-combination reaction:

$$MEPBr+Br_2 \leftrightarrow [MEP]+[Br_3]- \quad (5)$$

[MEP]+[Br_3]– is a complex that is in liquid phase and is uniformly distributed in the electrolyte volume. Sequestering the elemental bromine in this type of complex helps towards the safety of the battery system, as in the case of a damage to the battery and electrolyte leaking out, the toxic and foul-smelling bromine does not get exposed. Besides, the more bromine is sequestered, the less of that is available in the main electrolyte volume, and therefore less diffuses to the anode side of the insulating porous separator 106 to the anode side. That helps in reducing the self-discharge of the cell architectures built from the cell 100, thus greatly increasing its coulombic efficiency.

The rate constant combination or de-combination of the MEPBr/Br2 sequestration reaction is much faster than that of the TPABr/Br2 sequestration reaction. Therefore, if the system is designed to be able to deliver a lot of power per unit volume of cell, more of MEPBr is used as opposed to TPABr. On the other hand, when preservation of energy is required by reducing the self-discharge, more of TPABr is used as opposed to MEPBr. Both, TPABr and MEPBr may be purchased from Sigma-Aldrich, Inc.

During the charging operation, metallic zinc is plated out of the zinc bromide solution on to the anode sheet 103 on the side facing the insulating porous separator 106. The anode sheet 103 is typically made out of a zinc sheet of thickness 0.05 mm to 2 mm. In this implementation, the anode sheet 103 comprises the zinc sheet from part No. 1007T811 of McMaster-Carr Supply Company, with the thickness of 0.5 mm. Electro-deposition of zinc is much favored on a native zinc surface as opposed to a non-zinc conducting surface. As the deposition continues, a layer of plated zinc grows on the surface of the anode sheet 103. The anode insulating net 104 placed between the anode sheet 103 and insulating porous separator 106 facilitates growing the plating thickness without touching the insulating porous separator 106. In that way, the zinc metal does not touch the insulating porous separator 106 and therefore does not have the opportunity to penetrate the insulating porous separator 106, which would otherwise potentially electrically short the anode and cathode of the cell architectures built from the cell 100.

In one example, the anode insulating net 104 is a polyethylene net, a part No. 9314T26 from McMaster-Carr Supply Company, which has a thickness 0.6 mm and opening area of 60%. In examples of the present disclosure, the anode insulating net 104 comprises a polymer with opening area to surface area ratio greater than 0.4, and a thickness between 0.1 mm and 2 mm, with an opening area of at least 20%. As an alternative implementation, the surface of the insulating porous separator 106 facing the anode sheet 103 can be manufactured with ribs so that a net is naturally provided. For instance, the insulating porous separator 106 can be manufactured with a set of ribs of height between 0.1 mm and 0.4 mm, with a base width between 0.5 mm and 2 mm, and with a pitch between 2 mm and 15 mm.

During charging, on the cathode side, bromide ion is reduced to elemental aqueous bromine. Most of the reaction happens in the volume of the conductive, cathode graphite felt 108. Part of the bromine is complexed with TPABr in the volume of CSV 109, and part of the bromine is complexed with MEPBr and stays within the cathode volume.

The electrical connections and the flow of charge takes place during the charging as follows: The anode current collector 102 and cathode current collector 110 are presented with a negative and positive electrical potential, respectively. Charging effectively starts when the potential difference is greater than 1.85V. Different types of charging algorithms may be used. In examples of the present disclosure, constant current constant voltage fixed time (CC-CV-FT) charging algorithm is used. The voltage is closed-loop adjusted so that a constant current of C/5, where C represents the coulombic capacity of the cell 100, flowed into the cell 100 as charging current for 5 hours, subject to the maximum cell voltage being 2.0V, upon which the current would be tapered down to maintain the constant current.

When most of the zinc and bromine are electro-deposited out of the electrolyte volume, resistance of the cell 100 increases and so does the cell voltage at a given current.

The cathode current collector 110 is a sheet made of a conductive material resistant to bromine. In one example, the cathode current collector 110 is a sheet of titanium, with thickness of 0.15 mm, with part No. 9051K48 from McMaster-Carr Supply Company. In another example, cathode current collector 110 is conductive but is a non-metallic sheet such as a graphite loaded plastic sheet. However, the surface area of a titanium or conductive plastic surface is not sufficient for bromide-bromine reaction to proceed in a fast way. Therefore, the cathode graphite felt 108 is introduced as a surface area enhancer for the cathode current collector 110.

The cathode graphite felt 108 is manufactured from an unwoven polymeric fabric of rayon, cellulose, or polyacrylonitrile (PAN) by heating it in vacuum or in absence of oxygen at refractory temperatures, typically above 2,000 degrees C., thus turning the polymeric fabric into a graphite felt. The cathode graphite felt 108 may subsequently be activated by chemically or electrochemically etching the surface of the graphite fibers in the felt to increase the effective surface area. In one example, the cathode graphite felt 108 comprises of part No. G600 of the Avcarb LLC with an uncompressed thickness of 6 mm, with a porosity of 90%, and with a fiber thickness of 50 micron. However, in other applications and implementations, the cathode graphite felt 108 may have a thickness between 0.5 mm and 10 mm, with an uncompressed porosity between 50% and 97%, with a fiber diameter between 5 micron and 200 microns.

The cathode insulating mesh 107 prevents the cathode graphite felt 108 from directly touching the insulating porous separator 106. In case of the cathode graphite felt 108 and the insulating porous separator 106 touching each other, loose fibers from the cathode graphite felt 108 can dislodge and penetrate into the pores of the insulating porous separator 106 and reach the anode, thus creating an electrical short. In examples of the present disclosure, a fiberglass filter paper disc with part No. 6737T44 from McMaster-Carr Supply Company of thickness 0.3 mm is used for the cathode insulating mesh 107.

In examples of the present disclosure, the insulating porous separator 106 is placed between the anode insulating net 104 and the cathode insulating mesh 107, essentially dividing the anode and cathode sides of the cell 100. The insulating porous separator 106 is typically a micro- or nano-porous separator with thickness between 20 micron and 2 mm, porosity between 20% and 90%, and is made of a poly-olefin material, such as polyethylene or polypropylene. In examples of the present disclosure, a commercial porous separator part No. 3401 from Celgard, LLC was used. The insulating porous separator 106 prevents a direct short between the anode and cathode sides. It is also chosen with sufficient tortuosity such that the free diffusion of ions between the anode and cathode sides are discouraged, which otherwise would result in large self-discharge (more than 5% of total capacity per hour) of the cell.

During the discharging of the cell, the plated metallic zinc on the anode sheet 103 electrochemically oxidizes into zinc ion and dissolves back into the electrolyte volume. At the same time, at cathode current collector 110 and cathode graphite felt 108, bromine de-combines from the complexing agents and is reduced to bromide ions and dissolves into the electrolyte volume.

Mechanical sealing structures for the cell 100 are not shown in FIG. 1. The cell 100 can be packaged and configured in many different ways in order to increase the effective cell surface area for getting high capacity.

Figure 2A:
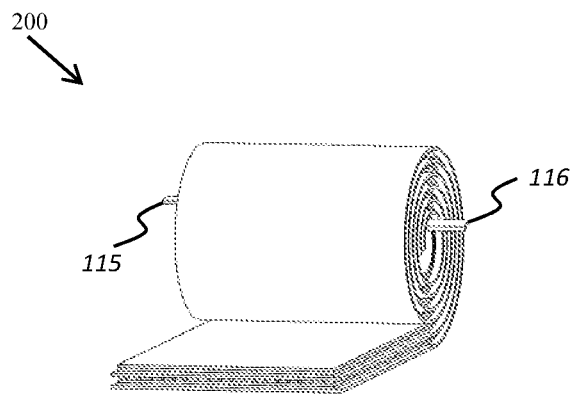
FIG. 2A is an isotropic view and FIG. 2B is a partially zoomed-in view of a zinc bromine electrochemical cell in a rolled format in examples of the present disclosure.
Figure 2B:
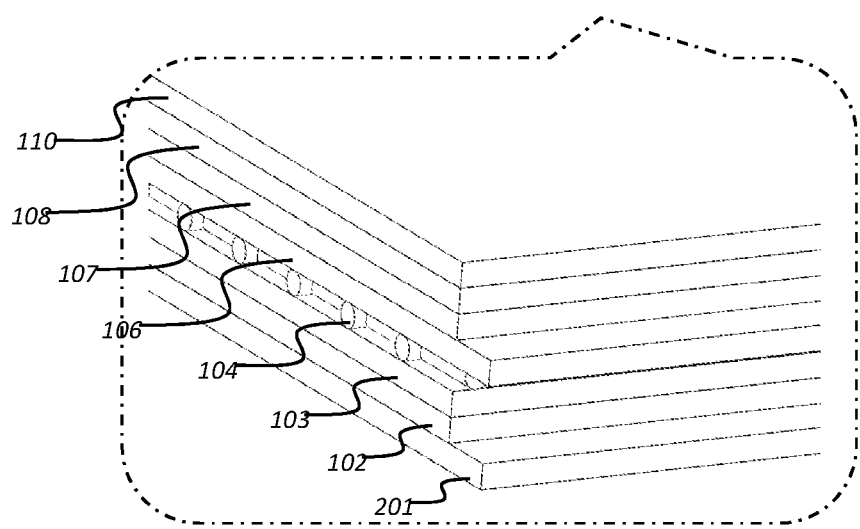

FIG. 2A is an isotropic view and FIG. 2B is a partially zoomed-in view of a zinc bromine electrochemical cell 200 in a rolled format in examples of the present disclosure. In examples of the present disclosure, the cell 100 may have high aspect ratio (larger than 3:1) components so that it can be rolled into a spiral shape or a cylindrical shape, see cell 200 of FIG. 2A. Subsequently, for the purpose of compactness, the cylindrical cell 200 is assembled into a sealable cylindrical container 900 of FIG. 9.

In examples of the present disclosure, the cell 100 may have high aspect ratio (larger than 3:1) components so that it can be folded, see cell 300 of FIG. 3. In one example, cell 300 is of a Z-fold shape. In another example, cell 300 is of a zig-zag shape. Subsequently, for the purpose of compactness, the cell 300 is assembled into a sealable, rectangular prism container 1100 of FIG. 11.

A stacked cell 700 of FIG. 7 contains two or more cells 100 of FIG. 1. Subsequently, for the purpose of compactness, the stacked cell 700 is assembled into a sealable, rectangular prism container 1000 of FIG. 10.

Figure 8:
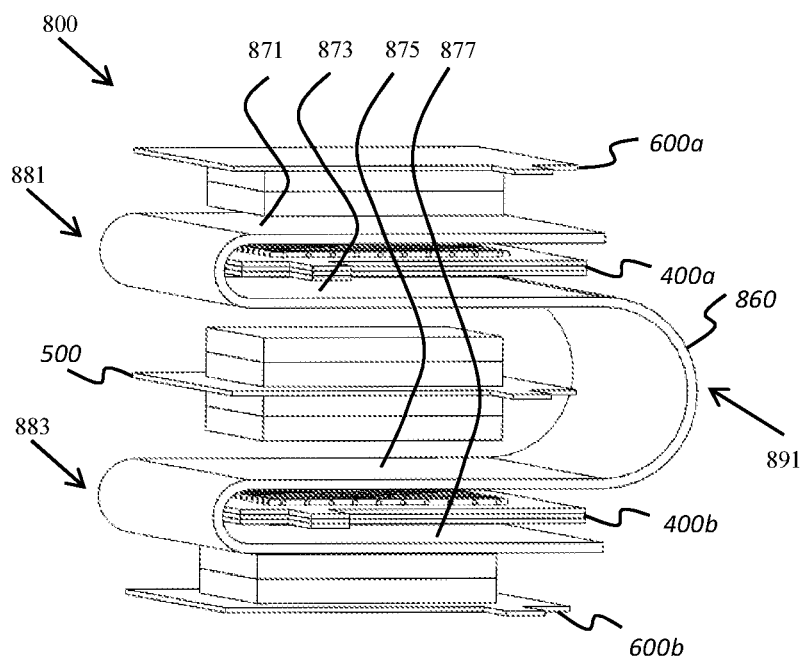
FIG. 8 is an isotropic view of another stacked cell in examples of the present disclosure.

A stacked cell 800 of FIG. 8 contains two or more cells 100 of FIG. 1. The stacked cell 800 further contains a continuous separator 860 of FIG. 8. Subsequently, for the purpose of compactness, the stacked cell 800 is assembled into a sealed, rectangular prism container 1000 of FIG. 10.

In examples of the present disclosure, cell 100 is rollable. Cell 100 is rolled into a spiral shape, see cell 200 of FIG. 2A. The components create a stack—anode current collector 102, anode sheet 103, anode insulating net 104, insulating porous separator 106, cathode insulating mesh 107, cathode graphite felt 108, and cathode current collector 110 are stacked up in the sequence described in accordance with the cell 100 of FIG. 1. In examples of the present disclosure, an electrically insulating sheet 201 is attached to the anode current collector 102. Then the stack is rolled into the cell 200. In one example, the electrically insulating sheet 201 is made of plastic. The electrically insulating sheet 201 prevents the anode current collector 102 from contacting the cathode current collector 110, which would have otherwise resulted in the undesired outcome of electrically shorting the cell 200.

In examples of the present disclosure, the electrically insulating sheet 201 comprises a polymeric material resistant to bromine. In one example, the electrically insulating sheet 201 is a sheet of polyethylene or polypropylene with a thickness ranging from 0.02 mm to 1 mm.

Figure 9:
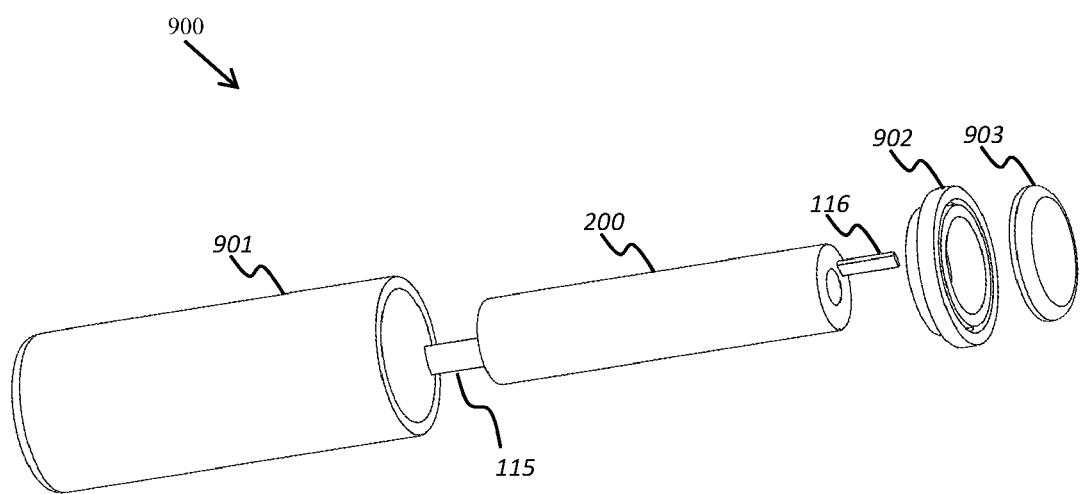
FIG. 9 is an exploded plot of a cylindrical cell container and a cell in examples of the present disclosure.

FIG. 9 is an exploded plot of a cylindrical cell container 900 and a cell 200 in examples of the present disclosure. The cylindrical cell container 900 comprises a metallic housing 901, an insulating plug 902, and a metallic cap 903. The cell 200 comprises an anode connection tab 115 and a cathode connection tab 116. In examples of the present disclosure, the cell 200 is sealed inside the container 900 so that outside ambient such as air and water may not get into the container 900 and vapor of electrolyte inside the container 900 may not get out to the ambient.

The cell 200 is inserted in the metallic housing 901. The anode connection tab 115 is welded with the inside the metallic housing 901, thus making the body of the metallic housing 901 as the negative terminal of the package, including the cylindrical cell container 900 and the cell 200. The insulating plug 902 is inserted in the open end of the metallic housing 901 before welding the cathode connection tab 116 to the metallic cap 903, which serves as the positive terminal of the package, including the cylindrical cell container 900 and the cell 200. At this point, a predetermined amount of electrolyte is injected into the metallic housing 901 facilitating being soaked into the gaps in the cell 200, such that the cell is adequately full of electrolyte. The insulating plug 902 and metallic cap 903 are then snugly inserted into the housing 901, and sealed by adhesive or mechanical crimping to achieve an adequate mechanical seal. External electrical contacts of the package, including the cylindrical cell container 900 and the cell 200, are available through the anode connection tab 115 and the cathode connection tab 116. The insulating plug 902 serves as the barrier between the positive terminal, metallic housing 901, and the negative terminal, metallic cap 903, thus preventing an electrical short.

Figures 3A, 3B:
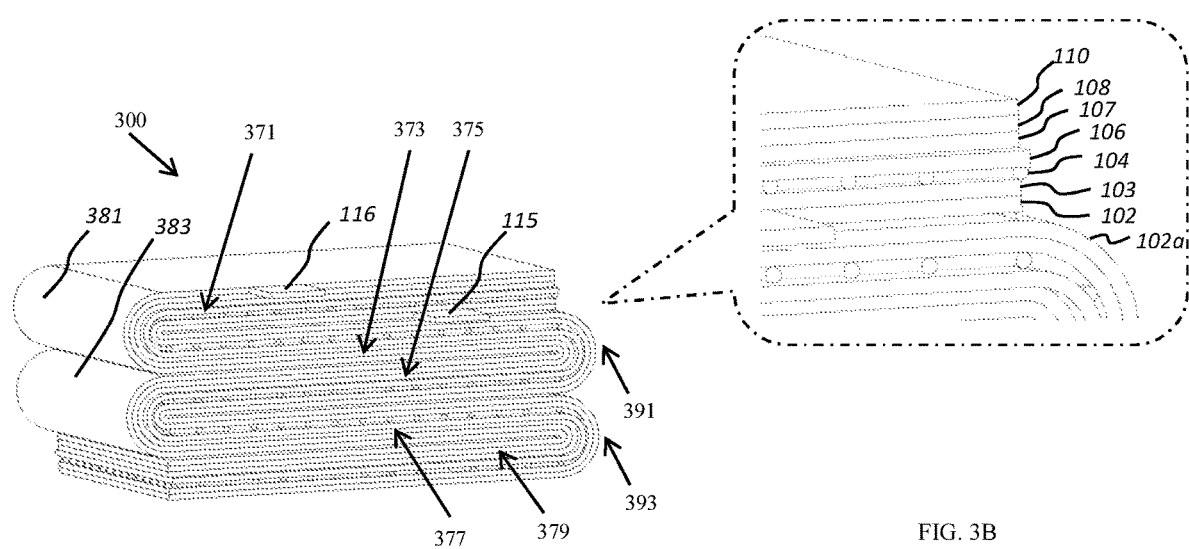
FIG. 3A is an isotropic view and FIG. 3B is a partially zoomed-in view of a zinc bromine electrochemical cell in a folded format in examples of the present disclosure.

FIG. 3A is an isotropic view and FIG. 3B is a partially zoomed-in view of a zinc bromine electrochemical cell 300 in a folded format in examples of the present disclosure. The cell 300 is of a Z-fold shape or a zig-zag shape. In examples of the present disclosure, the cell 300 is folded from the cell 100 of FIG. 1. The components create a stack—anode current collector 102, anode sheet 103, anode insulating net 104, insulating porous separator 106, cathode insulating mesh 107, cathode graphite felt 108, and cathode current collector 110 are stacked up in the sequence of cell 100 of FIG. 1. The cell 100 is then folded on the same polarity as shown in FIG. 3 such that the anode current collector 102 and cathode current collector 110 never touch each other.

In one example, the zig-zag shape comprises a plurality of horizontal sections 371, 373, 375, 377, and 379, a first plurality of arc sections 381 and 383 on a first side, and a second plurality of arc sections 391 and 393 on a second side opposite the first side. The zig-zag shape is in the order of the horizontal section 371, the arc section 381, the horizontal section 373, the arc section 391, the horizontal section 375, the arc section 383, the horizontal section 377, the arc section 393, and the horizontal section 379. In examples of the present disclosure, a bottom surface of the horizontal section 371 directly contacts a top surface of the horizontal section 373. A bottom surface of the horizontal section 373 directly contacts a top surface of the horizontal section 375. A bottom surface of the horizontal section 375 directly contacts a top surface of the horizontal section 377. A bottom surface of the horizontal section 377 directly contacts a top surface of the horizontal section 379.

FIG. 11A is an isotropic view and FIG. 11B is an exploded plot of cell container 1100 and cell 300 in examples of the present disclosure. The cell container 1100 comprises a housing 1101, a cover 1102, an electrical tab 1103 welded with a connection header 1105, and an electrical tab 1104 welded with a connection header 1106. The cell 300 comprises an anode connection tab 115 and a cathode connection tab 116. The cell 300 is inserted into the container 1100. In one example, the housing 1101 is of a rectangular prism shape.

In one example, a pre-determined amount of electrolyte is then inserted into the housing 1101 so that it soaks the electrodes and separator adequately. In another example, an extra amount of electrolyte may be poured into the housing 1101 so that the cell 300 is always in a flooded state. The connection tabs 115 and 116 of the cell 300 are inserted into the electrical tabs 1103 and 1104 respectively through the apertures of the cover 1102 and are welded or soldered. The cover 1102 is then fitted to the housing 1101 and the perimeter is sealed with adhesive bonding or ultrasonic welding. The electrical tabs 1103 and 1104 are then inserted into the respective apertures in the cover 1102 and the perimeters are sealed with adhesive bonding or ultrasonic welding. The electrical terminals of the cell 300 are now available as mounting headers 1105 and 1106 for external connections, thus making the prismatic sealed package including the container 1100 and the cell 300, a battery package.

Figures 6A, 6B:
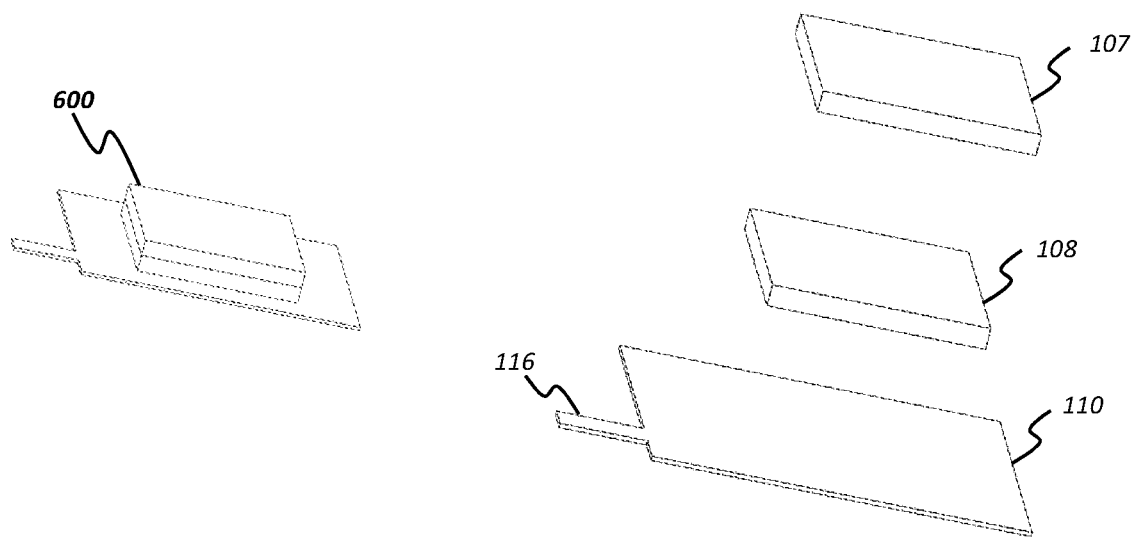
FIG. 6A is an isotropic view and FIG. 6B is an exploded plot of a cathode end-plate subassembly in examples of the present disclosure.
Figure 7A:
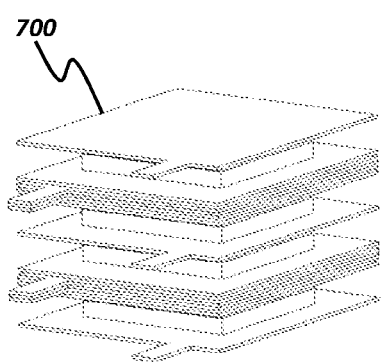
FIG. 7A is an isotropic view and FIG. 7B is an exploded plot of a stacked cell in examples of the present disclosure.
Figure 7B:
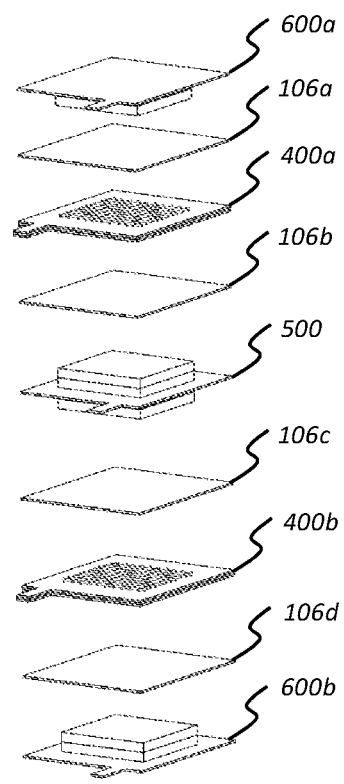

FIG. 7A is an isotropic view and FIG. 7B is an exploded plot of a stacked cell 700 in examples of the present disclosure. In examples of the present disclosure, stacked cell 700 comprises two or more cells 100 of FIG. 1. The cell 100 may be repeated in a stacked or a sandwich form. FIG. 10A is an isotropic view and FIG. 10B is an exploded plot of a cell container 1000 and a cell 700 in examples of the present disclosure. The cell container 1000 comprises a housing 1001, a cover 1002, an electrical tab 1003 welded with a connection header 1005, and an electrical tab 1004 welded with a connection header 1006. Subsequently, the stacked cell 700 is assembled into a sealed rectangular prism housing 1001. In examples of the present disclosure, the cell 700 comprises an anode subassembly 400 of FIG. 4, a cathode subassembly shown of FIG. 5, and a cathode end-plate subassembly 600 of FIG. 6.

The anode subassembly 400, as shown in FIG. 4, comprises a first anode insulating net 404a, a first anode sheet 403a, an anode current collector 502, a second anode sheet 403b, and a second anode insulating net 404b. The anode current collector 502 comprises a connection tab 415. The anode current collector 502 is sandwiched between the first anode sheet 403a and the second anode sheet 403b. The first anode insulating net 404a is placed on the first anode sheet 403a. The second anode insulating net 404b is placed on the second anode sheet 403b.

Figures 5A, 5B:
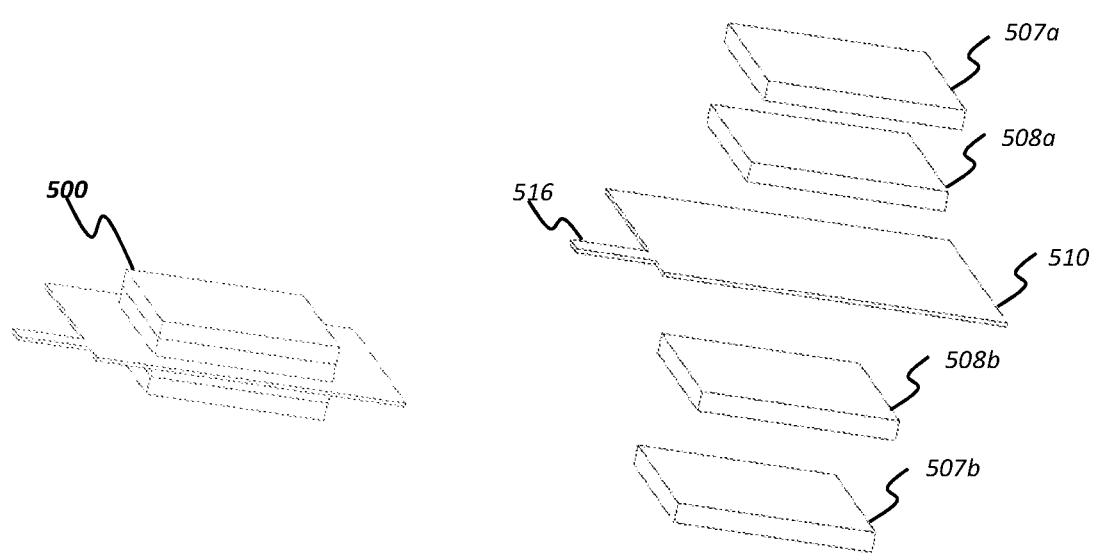
FIG. 5A is an isotropic view and FIG. 5B is an exploded plot of a portion of a cathode-side subassembly in examples of the present disclosure.

The cathode subassembly 500, as shown in FIG. 5, comprises a first cathode insulating mesh 507a, a first cathode graphite felt 508a, a cathode current collector 510, a second cathode graphite felt 508b, and cathode insulating mesh 507b. The cathode current collector 510 comprises a connection tab 516. The cathode current collector 510 is sandwiched between the first cathode graphite felt 108a and the second cathode graphite felt 108b. The first cathode insulating mesh 107a is placed on the first cathode graphite felt 108a. The second cathode insulating mesh 107b is placed on the second cathode graphite felt 108b.

The cathode end-plate subassembly 600, as shown in FIG. 6, comprises a cathode current collector 110 with a connection tab 116, a cathode graphite felt 108, and a cathode insulating mesh 107. The cathode graphite felt 108 is placed between the cathode current collector 110 and the cathode insulating mesh 107.

The cathode end-plate subassembly 600, the anode subassembly 400, the cathode subassembly 500 and the separator 106 are arranged in sequence to make the cell 700. It is arranged according to the following rules—(a) separator 106 has anode subassembly 400 on one side and either cathode subassembly 500 or cathode end-plate subassembly 600 on the other side; (b) If touching the cathode subassembly 500 or cathode end-plate subassembly 600, separator 106a, 106b, 106c, or 106d touches the cathode insulating mesh 107; (c) the two ends of the cell 700 are cathode end-plate subassemblies 600a and 600b. Following these three rules, the cell 700 can be made as thick, with increased number of cells 100, as desired in order to meet the unit capacity requirements.

In the example shown in FIG. 7, the stack-up for the cell 700 is sequenced as follows—cathode end-plate assembly 600a, separator 106a, anode subassembly 400a, separator 106b, cathode subassembly 500, separator 106c, anode subassembly 400b, separator 106d, and cathode end-plate subassembly 600b.

The cell 700 is then inserted into the container 1000 shown in FIG. 10. The container 1000 comprises a housing 1001, a cover 1002, electricals tabs 1003 and 1004 welded with connection headers 1005 and 1006, respectively. In one example, a pre-determined amount of electrolyte is then inserted into the housing 1001 so that it soaks the electrodes and separator adequately. In another example, an extra amount of electrolyte may be poured into the housing 1001 so that the cell 700 is always in a flooded state. The connection tabs 115 and 116 of the cell 700 are inserted into the electrical tabs 1003 and 1004 respectively through the apertures of the cover 1002 and are welded or soldered. The cover 1002 is then fitted to the housing 1001 and the perimeter is sealed with adhesive bonding or ultrasonic welding. The electrical tabs 1003 and 1004 are then inserted into the respective apertures in the cover 1002 and the perimeters are sealed with adhesive bonding or ultrasonic welding. The electrical terminals of the cell 700 are now available as mounting headers 1005 and 1006 for external connections, thus making the package including the container 1000 and the cell 700, a battery package.

FIG. 8 is an isotropic view of a stacked cell 800 in examples of the present disclosure. The stacked cell 800 is a variation of the cell 700 of FIG. 8. In the stacked cell 800, the separator 860 is a continuous sheet as opposed to being in separators 106a, 106b, 106c, and 106d of FIG. 7B. In examples of the present disclosure, the separator 860 comprises a plurality of horizontal sections 871, 873, 875, and 877, one or more first arc sections 881 and 883 on a first side, one or more second arc sections 891 on a second side opposite the first side. The separator 860 is in the order of the horizontal section 871, the arc section 881, the horizontal section 873, the arc section 891, the horizontal section 875, the arc section 883, and the horizontal section 877. The anode subassembly 400a is between the horizontal section 871 and the horizontal section 873. The cathode subassembly 500 is between the horizontal section 873 and the horizontal section 875. The anode subassembly 400b is between the horizontal section 875 and the horizontal section 877. In examples of the present disclosure, the horizontal section 871, the arc section 881, the horizontal section 873 form a first letter U shape. The horizontal section 875, the arc section 883, the horizontal section 877 form a second letter U shape. The arc section 891 connects the first letter U shape to the second letter U shape.

Those of ordinary skill in the art may recognize that modifications of the embodiments disclosed herein are possible. For example, a total number of the folds of FIG. 3A may vary. Other modifications may occur to those of ordinary skill in this art, and all such modifications are deemed to fall within the purview of the present invention, as defined by the claims.

The invention claimed is:
1. An electrochemical cell comprising:
an anode-side subassembly comprising:
   an anode current collector;
   an anode sheet; and
   an anode insulating net comprising a plurality of openings;
an insulating porous separator; and
a cathode-side subassembly comprising:
   a cathode insulating mesh;
   a cathode graphite felt; and
   a cathode current collector;
wherein the anode sheet comprises zinc;
wherein a thickness of plated zinc on the anode sheet increases during a charging process; and
wherein the electrochemical cell is rolled into a spiral shape.

2. The electrochemical cell of claim 1, wherein the electrochemical cell is placed in a container of a cylindrical shape;
   wherein the container comprises
      a metallic housing;
      an insulating plug; and
      a metallic cap;
   wherein the anode current collector comprises
      an anode connection tab attached to the metallic housing of the container; and
   wherein the cathode current collector comprises
      a cathode connection tab attached to the metallic cap of the container.

3. The electrochemical cell of claim 2, wherein the container is filled with a pre-determined amount of electrolyte.

4. The electrochemical cell of claim 2, wherein an electrically insulating sheet is attached to the anode current collector.

5. An electrochemical cell comprising:
   an anode-side subassembly comprising:
      an anode current collector;
      an anode sheet; and
      an anode insulating net comprising a plurality of openings;
   an insulating porous separator; and
   a cathode-side subassembly comprising:
      a cathode insulating mesh;
      a cathode graphite felt; and
      a cathode current collector;
   wherein the electrochemical cell is folded into a zig-zag shape.

6. The electrochemical cell of claim 5, wherein the zig-zag shape comprises
   a plurality of horizontal sections;
   a first plurality of arc sections on a first side; and
   a second plurality of arc sections on a second side opposite the first side.

7. The electrochemical cell of claim 5, wherein the electrochemical cell is placed in a container of a rectangular prism shape;
   wherein the container comprises
      a housing;
      a cover;
      a first electrical tab comprising a connection header; and
      a second electrical tab comprising a connection header;
   wherein the anode current collector comprises
      an anode connection tab attached to the first electrical tab of the container; and
   wherein the cathode current collector comprises
      a cathode connection tab attached to the second electrical tab of the container.

8. The electrochemical cell of claim 7, wherein the container is filled with a pre-determined amount of electrolyte.

9. The electrochemical cell of claim 8, wherein the pre-determined amount of electrolyte facilitates the electrochemical cell being in a flooded state.

10. A stacked electrochemical cell comprising:
    a first cathode end-plate subassembly;
    a first anode-side subassembly comprising:
       an anode current collector;
       an anode sheet; and
       an anode insulating net comprising a plurality of openings;
    a cathode-side subassembly comprising:
       a cathode insulating mesh;
       a cathode graphite felt; and
       a cathode current collector;
    a second anode-side subassembly comprising:
       an anode current collector;
       an anode sheet; and
       an anode insulating net comprising a plurality of openings; and
    a second cathode end-plate subassembly.

11. The stacked electrochemical cell of claim 10 further comprising:
    a first insulating porous separator between the first cathode end-plate subassembly and the first anode-side subassembly;
    a second insulating porous separator between the first anode-side subassembly and the cathode-side subassembly;
    a third insulating porous separator between the cathode-side subassembly and the second anode-side subassembly; and
    a fourth insulating porous separator between the second anode-side subassembly and the second cathode end-plate subassembly.

12. The stacked electrochemical cell of claim 11, wherein the stacked electrochemical cell is placed in a container of a rectangular prism shape;
    wherein the container comprises
       a housing;
       a cover;
       a first electrical tab comprising a connection header; and
       a second electrical tab comprising a connection header;
    wherein the anode current collector of the first anode-side subassembly comprises an anode connection tab attached to the first electrical tab of the container;
    wherein the cathode current collector of first anode-side subassembly comprises a cathode connection tab attached to the second electrical tab of the container;
    wherein the anode current collector of the second anode-side subassembly comprises an anode connection tab attached to the first electrical tab of the container; and
    wherein the cathode current collector of second anode-side subassembly comprises a cathode connection tab attached to the second electrical tab of the container.

13. The stacked electrochemical cell of claim 12, wherein the container is filled with a pre-determined amount of electrolyte.

14. The stacked electrochemical cell of claim 13, wherein the pre-determined amount of electrolyte facilitates the stacked electrochemical cell being in a flooded state.

15. The stacked electrochemical cell of claim 10 further comprising a continuous insulating porous separator comprising:
    a first portion of a letter U shape;
    a second portion of the letter U shape; and
    an arc section connecting the first portion to the second portion.

16. The stacked electrochemical cell of claim 15, wherein the stacked electrochemical cell is placed in a container of a rectangular prism shape;
    wherein the container comprises
       a housing;
       a cover;
       a first electrical tab comprising a connection header; and
       a second electrical tab comprising a connection header;

wherein the anode current collector of the first anode-side subassembly comprises an anode connection tab attached to the first electrical tab of the container;

wherein the cathode current collector of first anode-side subassembly comprises a cathode connection tab attached to the second electrical tab of the container;

wherein the anode current collector of the second anode-side subassembly comprises an anode connection tab attached to the first electrical tab of the container; and wherein the cathode current collector of second anode-side subassembly comprises a cathode connection tab attached to the second electrical tab of the container.

17. The stacked electrochemical cell of claim 16, wherein the container is filled with a pre-determined amount of electrolyte.

18. The stacked electrochemical cell of claim 17, wherein the pre-determined amount of electrolyte facilitates the stacked electrochemical cell being in a flooded state.

\* \* \* \* \*